US007122259B2

United States Patent
Takahashi

(10) Patent No.: US 7,122,259 B2
(45) Date of Patent: Oct. 17, 2006

(54) FUEL CELL STARTUP METHOD

(75) Inventor: Naoki Takahashi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 406 days.

(21) Appl. No.: 10/380,346

(22) PCT Filed: Oct. 25, 2002

(86) PCT No.: PCT/JP02/11077

§ 371 (c)(1),
(2), (4) Date: Mar. 13, 2003

(87) PCT Pub. No.: WO03/041202

PCT Pub. Date: May 15, 2003

(65) Prior Publication Data

US 2004/0018402 A1    Jan. 29, 2004

(30) Foreign Application Priority Data

Nov. 8, 2001    (JP)    ............................. 2001-342941

(51) Int. Cl.
*H01M 8/04* (2006.01)
(52) U.S. Cl. .............................. 429/13; 429/24; 429/34
(58) Field of Classification Search .................. 429/13, 429/24, 26, 34
See application file for complete search history.

(56) References Cited

U.S. PATENT DOCUMENTS

| 6,358,638 B1 * | 3/2002 | Rock et al. ................... 429/13 |
| 2002/0177017 A1 * | 11/2002 | Nelson et al. ................ 429/22 |
| 2004/0033395 A1 * | 2/2004 | Thompson ................... 429/13 |

FOREIGN PATENT DOCUMENTS

| EP | 1 195 830 | 4/2002 |
| JP | 58-23167 | 2/1983 |
| JP | 8-315843 | 11/1996 |
| JP | 2000-195533 | 7/2000 |
| JP | 2000-315514 | 11/2000 |
| WO | WO 00/65676 | 11/2000 |
| WO | WO 01/03215 | 1/2001 |

* cited by examiner

*Primary Examiner*—Tracy Dove
(74) *Attorney, Agent, or Firm*—McDermott Will & Emery LLP

(57) ABSTRACT

Ice in a fuel cell (1) is thawed by passing a hot gas flow in a fuel gas passage, oxidizing agent gas passage and cooling liquid passage in the fuel cell (1), and the fuel cell (1) is started from a low temperature state. When startup processing begins, a gas flow comprising dry, hot gas in which there is no water or effectively no water is passed through the fuel cell (1), and subsequently, a steam amount contained in the gas flow is increased according to the temperature rise of the fuel cell (1).

11 Claims, 8 Drawing Sheets

FUEL CELL STARTUP METHOD

FIELD OF THE INVENTION

This invention relates to startup of a fuel cell, and more particularly to a method of starting a fuel cell from a low temperature state.

BACKGROUND OF THE INVENTION

A polymer electrolyte fuel cell (PEFC) comprises a membrane known as a "MEA" comprising an anode and cathode formed by superimposing a catalyst and a gas diffusion electrode layer on both sides of a polymer electrolyte membrane, and a carbon or metal bipolar plate in which passages are formed for supplying fuel gas and oxidizing agent gas to these electrodes.

In order for the PEFC to generate power, the above polymer electrolyte membrane must contain moisture, so to ensure that the membrane retains moisture, the fuel gas and oxidizing agent gas supplied to the fuel cell are normally humidified. Pure water is also produced at the cathode when power is generated, so the oxidizing agent passage contains moisture. Normally, the fuel cell has a passage for circulating a cooling fluid to cool the heat which is generated, and pure water may be used as the cooling fluid. In a fuel cell where the gases are humidified and the water produced is recovered by interconnecting the cooling fluid passage, fuel gas passage and oxidizing agent gas passage via a porous member, the cooling fluid passage and porous member interior also contain water.

Therefore, water is contained in various parts of the fuel cell, and if the fuel cell is left for a long time in an environment below freezing point when it is not running, the water inside the fuel cell freezes. Hence, if the fuel cell is started from this state, the ice in the fuel cell must be thawed.

JP 2000-315514A published by the Japanese Patent Office in 2000 proposes a method of thawing the ice in the fuel cell by passing a hot gas into the fuel cell passages (fuel gas passage, oxidizing agent gas passage, cooling fluid passage).

SUMMARY OF THE INVENTION

However, a fuel cell immediately prior to thawing is at low temperature, so part of the hot gas flow is rapidly cooled on the passage walls, and liquefies. If this liquid is a small amount and in the liquid phase, it is blown away by the gas coming later and is transported downstream, so there is no problem, but if it is a large amount, it is not blown away by the gas flow, so it accumulates in the passages and may block the passages. Also, if this liquid is further cooled and solidifies, it adheres to the passage walls, and if the adhesion amount is large, it may again block the passages. If the passages are blocked, it is no longer possible to circulate gas to heat the fuel cell, and no longer possible to start the fuel cell.

The problem of blocking of the passages is expected to become more serious if the hot gas flow contains moisture. However, the temperature rise effect of the fuel cell is greater when there is moisture than when there is not. This is because water contained in steam in the hot gas flow is cooled inside the fuel cell and turns to ice, and the latent heat of the phase change is also transmitted to the fuel cell.

Thus, the fuel cell is thawed more efficiently when there is more water in the gas flow in the fuel cell, but this also increases the possibility that the passages will block.

It is therefore an object of this invention to efficiently thaw a fuel cell without causing blocking of passages.

In order to achieve above object, this invention provides a method for starting a fuel cell from a low temperature state, comprising passing a gas flow including dry, hot gas into a passage in the fuel cell when startup processing begins, and varying the amount of steam contained in the gas flow according to the temperature of the fuel cell after the startup processing begins.

The details as well as other features and advantages of this invention are set forth in the remainder of the specification and are shown in the accompanying drawings.

DESCRIPTION OF THE PREFERRED EMBODIMENTS

Figures 1, 2:
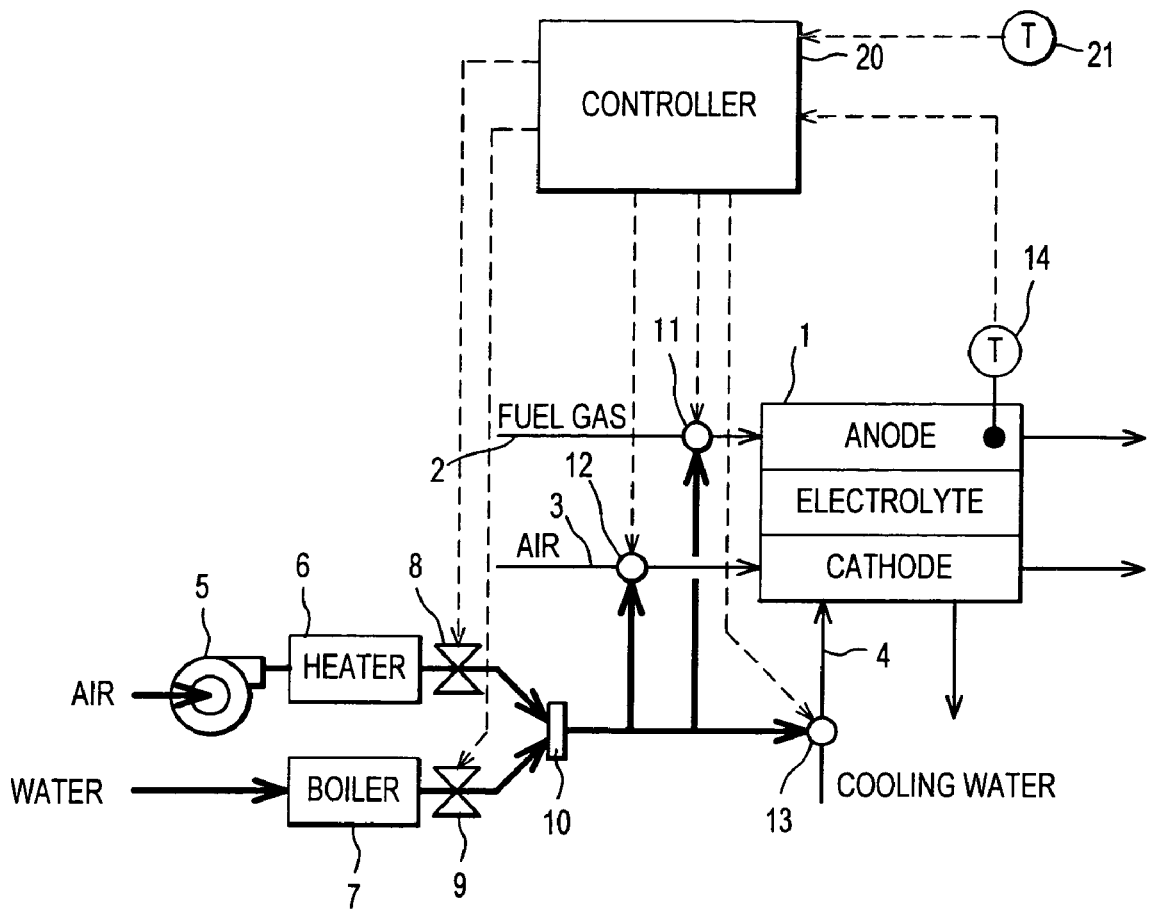
FIG. 1 is a schematic view of a fuel cell system and its thawing system.
FIG. 2 is a schematic view of a table specifying a relation between fuel cell temperature and valve openings.

Referring to FIG. 1 of the drawings, in a fuel cell system mounted in a fuel cell vehicle, a fuel cell thawing system is connected to a fuel gas line 2, air line 3 and cooling liquid line 4 of a fuel cell 1.

The thawing system comprises a dry, hot gas supply system which pressurizes air by a pump 5 and heats it by a heater 6 to generate dry, hot gas which is supplied to the fuel cell 1, and a water vapor supply system which heats water in a boiler 7 to generate steam which is supplied to the fuel cell 1. Dry, hot gas is gas having a humidity of 0% or effectively 0%. The heat source for the heater 6 and boiler 7 is supplied by burning a fuel such as gasoline or methanol. Instead of the heater 6 and boiler 7, the heating may be performed by a heater using power from a secondary cell installed in the vehicle, or by a heater using an external power supply in a parking lot.

The flowrates of the dry, hot gas and steam are respectively adjusted by valves 8, 9 which can adjust flowrate continuously or in stages. After the dry, hot gas and steam are mixed in a mixing manifold 10, they are introduced into the fuel gas line 2, air line 3 and cooling liquid line 4 via change-over valves 11, 12. The opening of these valves is controlled by a controller 20.

The fuel cell 1 uses pure water as the cooling liquid. The cooling liquid passage in the fuel cell 1 is connected to the fuel gas passage and oxidizing agent gas passage via a porous material. The internal temperature of the fuel cell 1 is detected by a temperature sensor 14, and the outside air temperature is detected by a temperature sensor 21.

When the fuel cell system has stopped, in order to avoid expansion due to the freezing of water in the cooling liquid passage 4 in the fuel cell 1, which would damage the fuel cell 1, water is discharged from the cooling liquid line 4 to the outside. However, even if water from the cooling liquid line 4 is discharged to the outside, water still remains in the porous separator, electrolyte membrane, fuel gas passage and oxidizing agent gas passage, and this remaining water freezes if the vehicle is left in an environment below freezing point.

In order to start the fuel cell system when it has frozen, it is first necessary to thaw the frozen water in the fuel cell 1. In this embodiment, thawing startup processing is performed as described below.

In thawing startup processing, firstly, the valve 8 in the dry hot gas supply system is opened, the change-over valves 11, 12, 13 are changed over so that the hot gas flow from the thawing system flows into the fuel cell 1, and hot air (dry, hot gas) is thereby supplied to the fuel gas passage, oxidizing agent gas passage and cooling liquid passage in the fuel cell 1. At this time, the valve 9 in the steam supply system is still closed.

The fuel cell 1 is heated by the dry, hot gas. As the internal temperature of the fuel cell 1 rises, the opening of the valve 9 increases so as to increase the humidification of the hot gas supplied to the fuel cell 1. The valve 8 is then gradually closed so that only steam is finally supplied to the fuel cell 1.

When steam is introduced to the fuel cell 1, the steam exchanges heat with the fuel cell 1, and the temperature falls so that it condenses to water or ice. When the steam becomes water or ice, the water gives up its latent heat to the fuel cell 1, so the heat transmitted to the fuel cell 1 is greater than when dry, hot gas at the same temperature is supplied, and the temperature rise rate per unit time increases. However, if the amount of condensed or frozen moisture inside the fuel cell 1 increases, the fuel gas line 2, air line 3 and cooling liquid line 4 will be blocked by the ice or water, and it will no longer be possible to heat the fuel cell 1 by supplying the hot gas flow.

Hence, according to this embodiment, the internal temperature of the fuel cell 1 is monitored, and the mixing ratio of dry, hot gas and steam is controlled so that an amount of steam which would not cause blocking of the passages at that temperature is supplied to the fuel cell 1. The control of the dry, hot gas flowrate and steam flowrate is performed according to the flowchart shown in FIG. 3.

Figure 3:
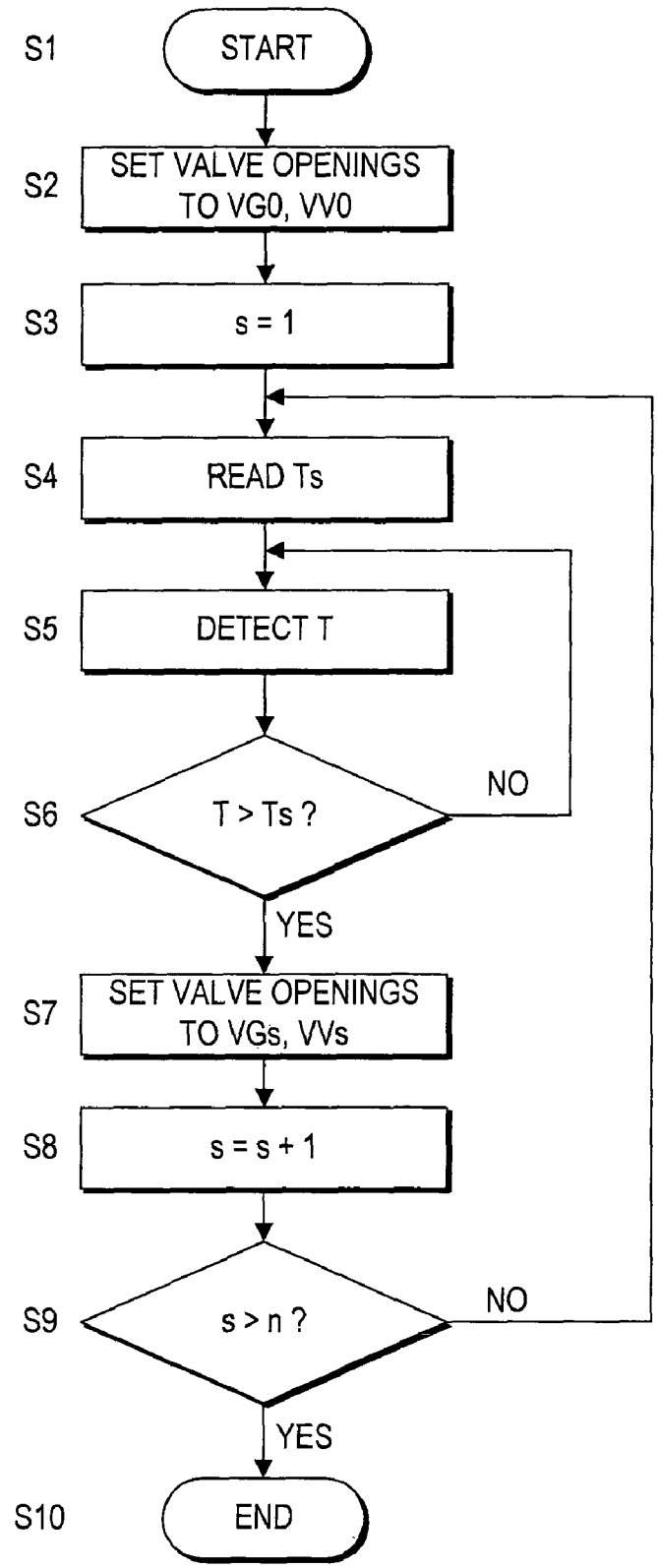
FIG. 3 is a flowchart showing a fuel cell thawing startup processing.

When the flowchart shown in FIG. 3 is performed, an opening VGs of the air valve 8 and an opening VVs of the steam valve 9 corresponding to the fuel cell temperature Ts are stored by a memory in the controller 20 as a table shown in FIG. 2. The valve openings VGs, VVs are valve openings at which a target steam amount Rs is reached, the steam amount Rs being the upper limit of steam amount at which blocking of passages in the fuel cell 1 at the fuel cell temperature Ts does not occur. These values are previously found by experiment. The valve openings VGs, VVs are defined for n sets excepting the initial values VG0, VV0, this set number n being the maximum value of temperature steps in the control described below.

The thawing startup processing will now be described in more detail referring to FIG. 3. This flowchart is performed by the controller 20 when the fuel cell system is started from the low temperature state.

First, in a step S1, when the fuel cell system is started, the change-over valves 11, 12, 13 change over so that the hot gas flow from the thawing system enters the fuel cell 1. In a step S2, the opening of the dry, hot gas valve 8 is set to VG0 and the opening of the steam valve 9 is set to VV0. By setting the opening VV0 so that steam flowing through the fuel cell 1 does not cause blockage immediately after startup processing has begun, hot air and a predetermined amount of steam are supplied to the fuel cell 1 according to the opening VG0 of the valve 8, and the temperature of the fuel cell 1 begins to rise. VV0 may also be set to zero at this time to supply only hot air and completely prevent blocking (FIG. 4D).

In a step S3, a temperature step s is set to one. In a step S4, a temperature T1 corresponding to the temperature step s=1, is read.

In a step S5, the internal temperature T of the fuel cell 1 is detected by the temperature sensor 14. In a step S6, the temperature T of the fuel cell 1 is compared with T1. When the temperature T of the fuel cell 1 is lower than T1, the routine returns to the step S5. When the temperature T of the fuel cell 1 rises to T1, the routine proceeds to a step S7, the openings of the valves 8, 9 are changed to values VG1, VV1 read from a table, and the steam amount of the gas flow supplied to the fuel cell 1 is set to R1. As a result, there is an additional temperature rise due to the latent heat of the water, and if the initial value VV0 is set to zero, the temperature increase rate of the fuel cell 1 will be higher than before steam was added.

In a step S8, the temperature step s is incremented by one step. In a step S9, the new temperature step s is compared with the maximum value n of the steps defined in the table, and if the temperature step s is less than n, the routine returns to the step 4.

When the temperature step s reaches two, and the temperature T of the fuel cell 1 has reached T2, the openings of the valves 8, 9 are respectively controlled to VG2, VV2 by looking up a table. As a result, the steam amount supplied to the fuel cell 1 is set to R2. Due to the temperature rise of the fuel cell 1, the steam amount sent to the fuel cell 1 increases without causing blocking of the passages due to condensation of water, the opening VV2 of the steam valve 9 is set larger than the value VV1 of the immediately preceding step, and the steam amount R2 is set larger than the value R1 of the immediately preceding step. As the steam amount supplied to the fuel cell 1 increases, the proportion of temperature rise of the fuel cell 1 due to latent heat increases, and the temperature rise rate of the fuel cell 1 further increases.

Subsequently, the steps from the step S4 to the step S8 are repeated until the temperature step s reaches the maximum step n, and the humidification of the gas flow supplied to the fuel cell 1 is increased according to the rise in the internal temperature of the fuel cell 1. When the temperature step s exceeds the maximum step n, the thawing startup process terminates. The valve opening table is set so that ice in the fuel cell 1 can be completely thawed and power generation can start when the temperature step reaches n.

Figure 4A:
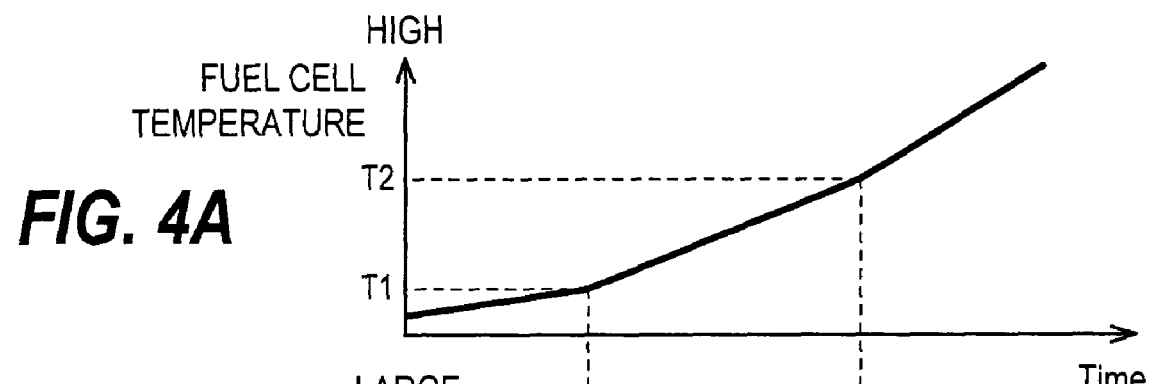
FIGS. 4A–4D are timing charts showing the fuel cell thawing startup processing.
Figure 4B:
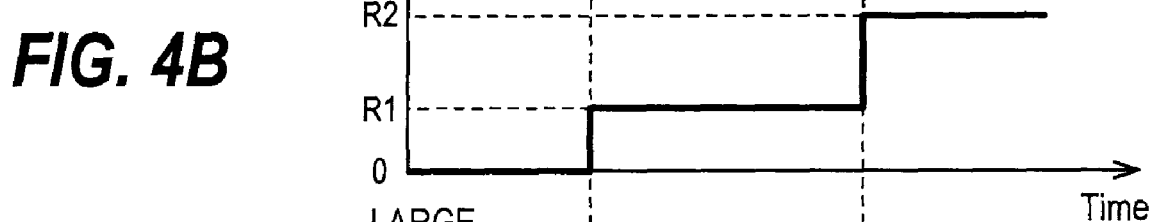
Figure 4C:
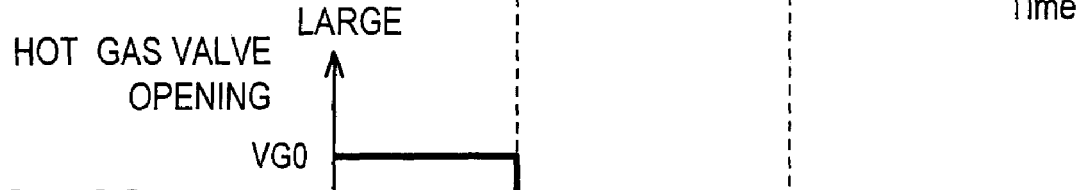
Figure 4D:
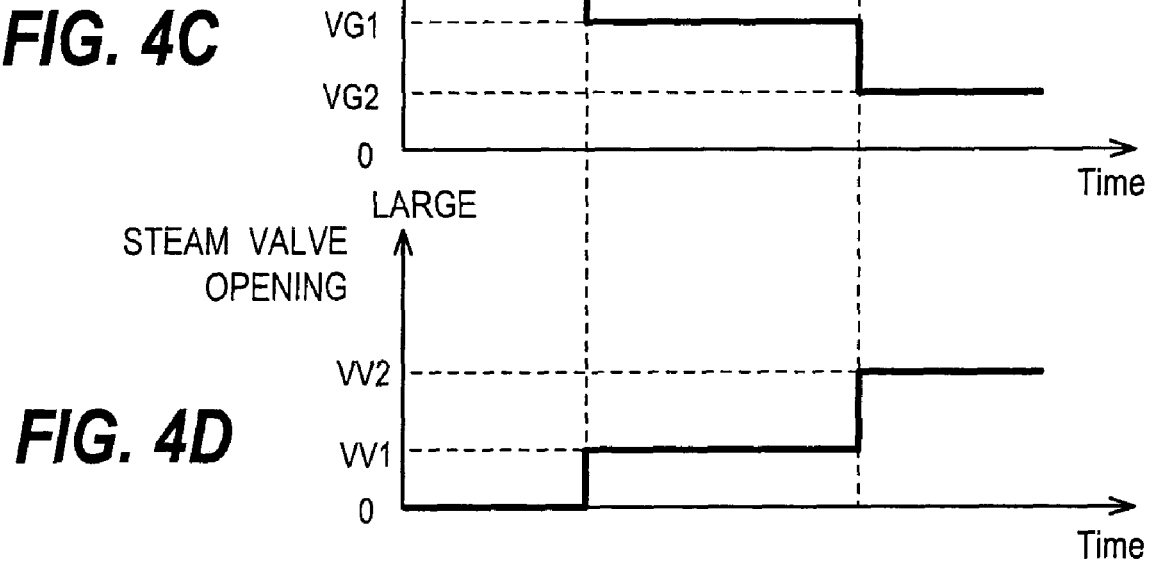
Figure 5A:
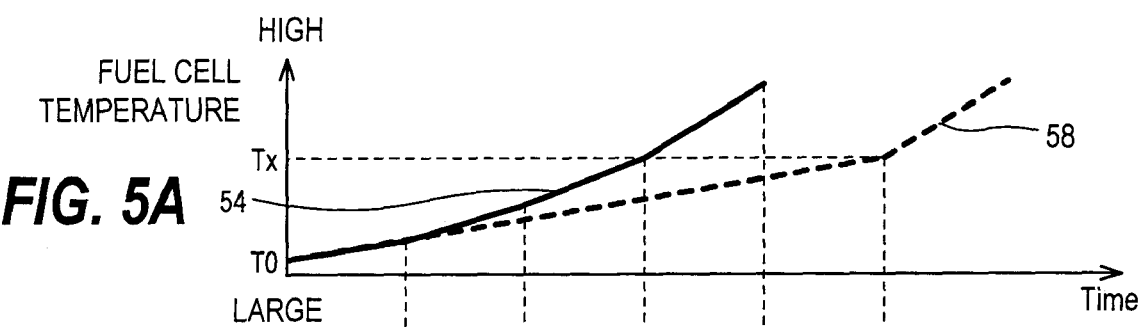
FIGS. 5A–5D are timing charts showing the fuel cell thawing startup processing.
Figure 5B:
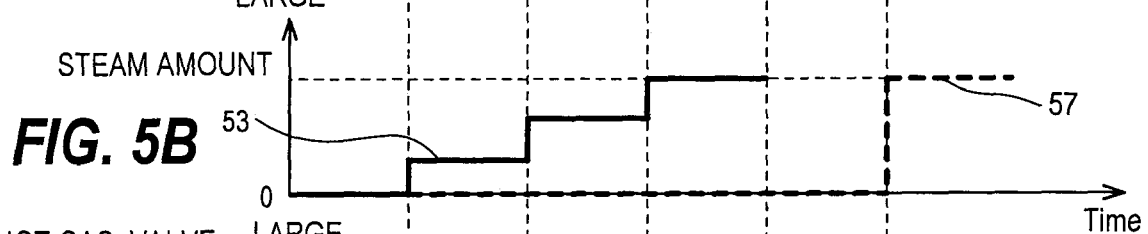
Figure 5C:
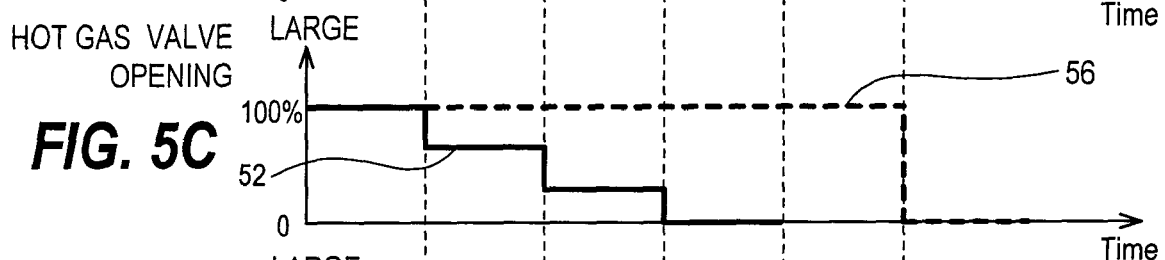
Figure 5D:
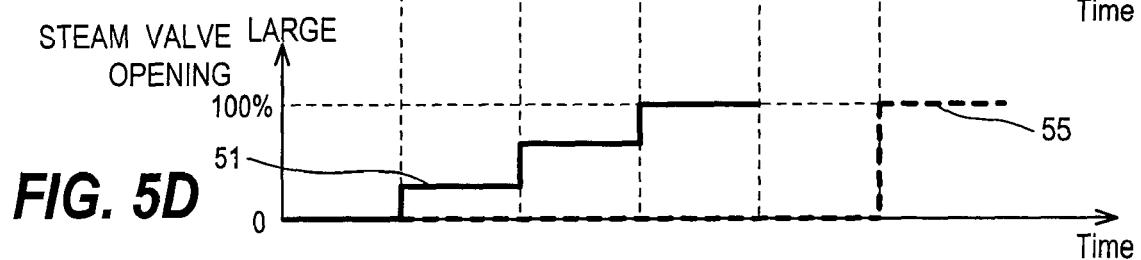

The above thawing startup process is shown in FIGS. 4A–4D. FIG. 4A shows the temperature of the fuel cell 1, FIG. 4B shows the steam amount in the gas flow to the fuel cell 1, FIG. 4C shows the opening of the dry, hot gas valve 8, and FIG. 4D shows the opening of the steam valve 9, respectively.

As shown here, immediately after startup processing begins, the steam valve has a small opening (in this example, fully closed) such that blocking of the passages does not occur, but when the temperature of the fuel cell 1 reaches T1, T2, . . . the opening increases in stages, so the steam amount supplied to the fuel cell 1 increases and the temperature rise rate of the fuel cell 1 also increases.

The openings of the valves 8, 9 are not changed over only between the two extreme values of fully open and fully closed, but are changed over in stages between these two extremes. Hence, by controlling to an intermediate value in this way, the fuel cell 1 can be efficiently thawed as shown below.

FIGS. 5A–5D, like FIGS. 4A–4D, are time charts showing the openings of the valves 8, 9, and the time-dependent variation of the steam amount and the temperature of the fuel cell 1. The solid lines 51 to 54 show the case where the valve openings are controlled in stages, and the broken lines 55 to 58 show the case where the openings of the valves 8, 9 are controlled to only one of fully open and fully closed. In the former case, the valve openings 51, 32 are changed over step by step according to the temperature rise of the fuel cell 1, and the steam amount gradually increases. On the other hand, in the latter case, until the fuel cell 1 reaches a temperature Tx at which only steam can be passed, the valve 8 is fully open and the valve 9 is fully closed, and only dry, hot gas is passed. When it reaches Tx, the valve 8 is fully closed and the valve 9 is fully opened so that only steam is passed.

In the latter case, only a gentle temperature rise is obtained until the temperature reaches Tx, so compared to the former case, it takes more time for the temperature rise and thawing of the fuel cell 1. Conversely, in the former case where the valve opening is controlled in stages according to the temperature of the fuel cell 1, the fuel cell 1 can be thawed efficiently. It will of course be understood that finer control can be continuously performed based on the correlation curve between temperature and valve openings.

In this embodiment, the fuel cell 1 uses pure water as the cooling liquid, and the cooling liquid passage, fuel gas passage and oxidizing agent gas passage are connected via a porous material to effect humidification and recover generated water, but an identical thawing startup method can be applied also to fuel cells having other constructions. For example, in a fuel cell where a non-freezing liquid is used for cooling, and the cooling liquid passage, fuel gas and oxidizing agent gas passages are not connected but are completely independent, the invention is applied in the following way.

In this case, there is no risk of the cooling liquid freezing, so the cooling liquid is not discharged from the fuel cell when the system stops. Water remaining in the fuel cell which freezes when it stops, is the water contained in the electrolyte membrane, the water remaining in the fuel gas passage and oxidizing agent gas passage for humidification and the water which is produced, so this water should be thawed on startup. Therefore, a thawing system corresponding to this type of fuel cell is substantially identical in basic construction to the case where pure water is used as the cooling fluid, but gas for thawing is not supplied to the cooling liquid line and the change-over valve 13 is not required. In the case of this construction, if a device is added to circulate the non-freezing fluid in addition to the aforesaid thawing startup system, ice in the fuel cell 1 can be even more effectively thawed.

Further, considering the difference from the outside air temperature when startup processing begins, the valve opening may be controlled so that the increase of steam amount in the gas flow is more gentle, the lower the outside air temperature becomes when startup begins. Specifically, in the step S7 of FIG. 3, the valve openings obtained by looking up the table are corrected according to the outside air temperature when startup processing begins, and the openings of the valves 8, 9 are set to the valve openings after the correction. In this way, when the outside air temperature is high, the increase rate of steam amount is enhanced so as to obtain a rapid temperature rise, and when the outside air temperature is low, blocking of the passages is avoided while effective thawing can be performed.

When simplification of control is a priority, when startup processing begins, the dry, hot gas valve 8 is opened, the steam valve 9 is closed so that only dry, hot gas is supplied to the fuel cell 1, and when the temperature of the fuel cell 1 reaches a predetermined temperature, the openings of the valves 9, 8 are adjusted so that the composition of the gas supplied to the fuel cell 1 is only steam, or alternatively a change-over can be made to a gas comprising steam and dry, hot gas (corresponding to the case of n=1). In this case, if the lowest temperature of the temperatures at which water in the passages does not solidify (or a higher temperature than this) is set to the predetermined temperature at which the change-over is performed, blocking of the passages due to condensation of water is prevented, and the fuel cell is efficiently heated and thawed by the latent heat of the water.

The predetermined temperature depends not only on the ease of condensation (the properties of the condensed water, i.e., maximum steam amount or saturated steam amount at a predetermined pressure or temperature), but also depends on the cross-section and length (ease of passage) of the fuel cell passages and on the size (thermal capacity) of the fuel cell, and is determined by experiment.

Next, a second embodiment of this invention will be described.

Figure 6:
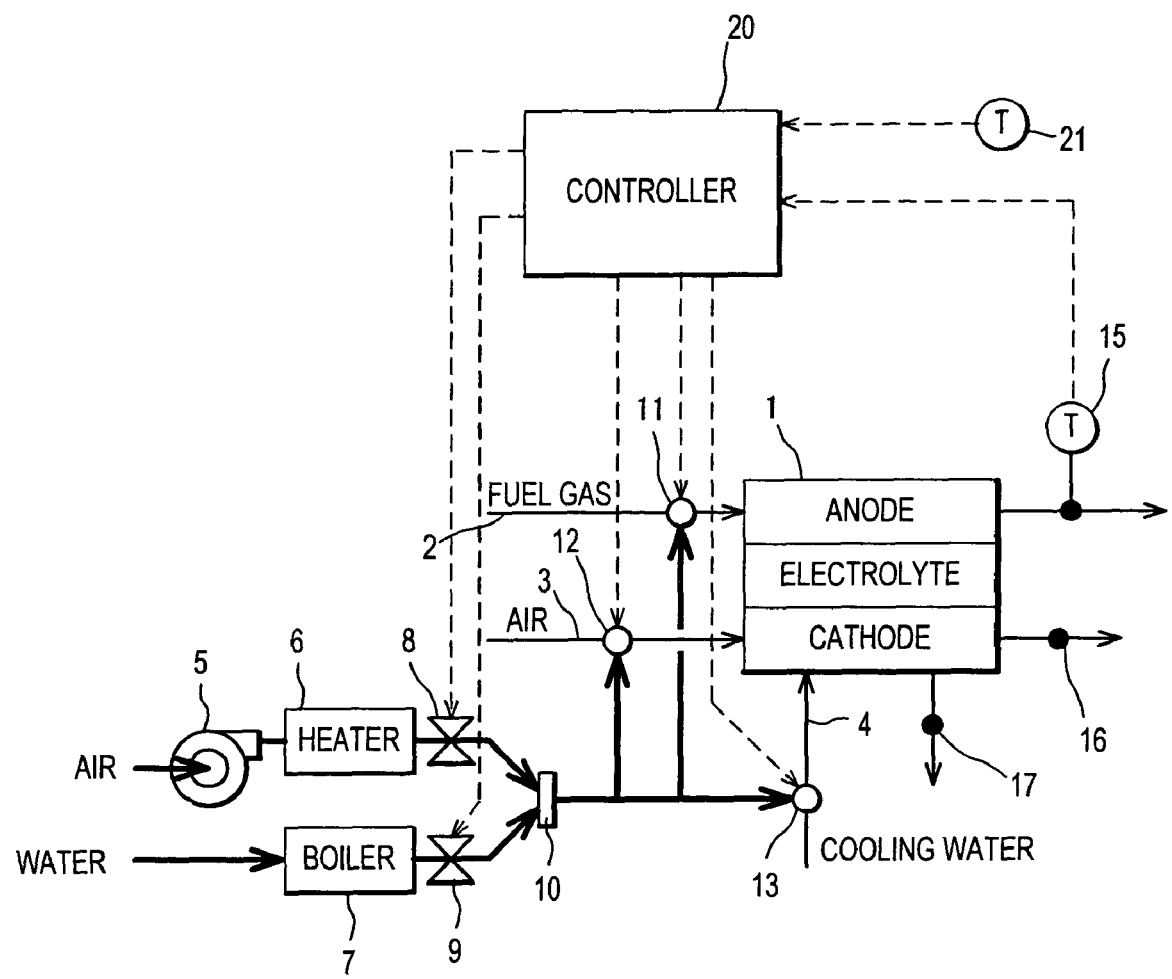
FIG. 6 is similar to FIG. 1, but showing a second embodiment of this invention.

FIG. 6 shows the second embodiment. The basic construction is identical to that of the first embodiment, but instead of the temperature sensor 14 inside the fuel cell 1, a temperature sensor 15 is installed in the vicinity of the outlet of the fuel cell 1 of the fuel gas line 2.

The temperature of the gas flow discharged from the outlet of the fuel cell 1 of the fuel gas line 2 when thawing starts is not identical to the internal temperature of the fuel cell 1, but rises as the internal temperature of the fuel cell 1 rises. Therefore, the rise of internal temperature of the fuel cell 1 can be estimated from the temperature of the gas flow discharged from the outlet of the fuel cell 1. If the values in the tables of valve opening versus temperature are set in accordance with the difference of sensor position, the same control as in the preceding embodiment can be performed, and the fuel cell can be efficiently thawed and started while preventing blockage of the passages.

Figure 7:
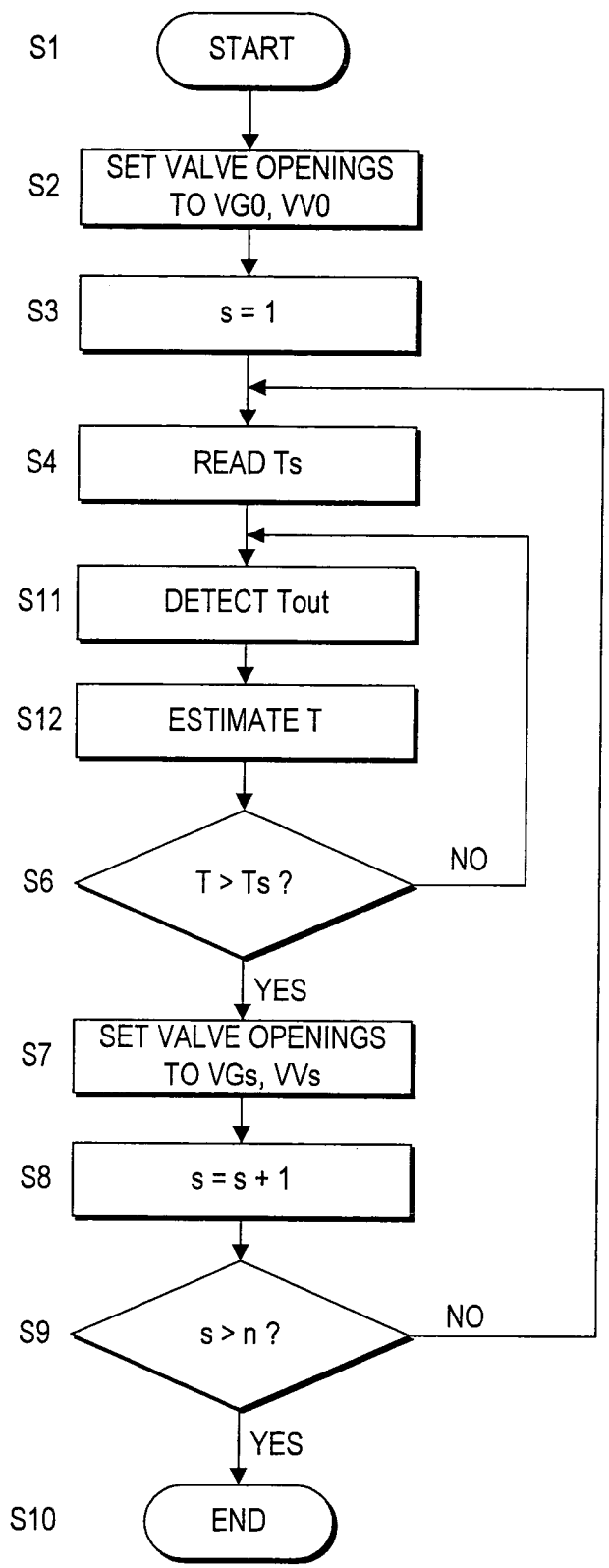
FIG. 7 is a flowchart showing the fuel cell thawing startup processing.

FIG. 7 shows a flowchart of thawing startup processing. The processing is identical to that of FIG. 3, except that a step S11 which detects the outlet temperature Tout of the fuel cell 1 is added, and instead of the step S5 which detects the temperature of the fuel cell 1, a step S12 which estimates the temperature T of the fuel cell 1 from the fuel cell outlet temperature Tout is provided.

In particular, when a temperature sensor was provided inside the fuel cell 1 in the preceding embodiment, it was necessary to avoid narrow passages and install a temperature sensor to prevent electrical short circuits in the thin bipolar plate, so manufacture was difficult, but in this embodiment it is sufficient to install the temperature sensor in one part of a pipe projecting to the outside from the fuel cell 1 and manufacture is easier.

In FIG. 6, the temperature sensor 15 is installed in the vicinity of the outlet of the fuel cell of the fuel gas line 2, but it may also be installed in the fuel cell outlet vicinity 16 of the air line 3 or fuel cell outlet vicinity 17 of the cooling liquid line 4. In this case also, the temperature of the fuel cell 1 is estimated from the detection results of the temperature sensor 15, and an identical control to the above can be performed.

Next, a third embodiment of this invention will be described.

Figure 8:
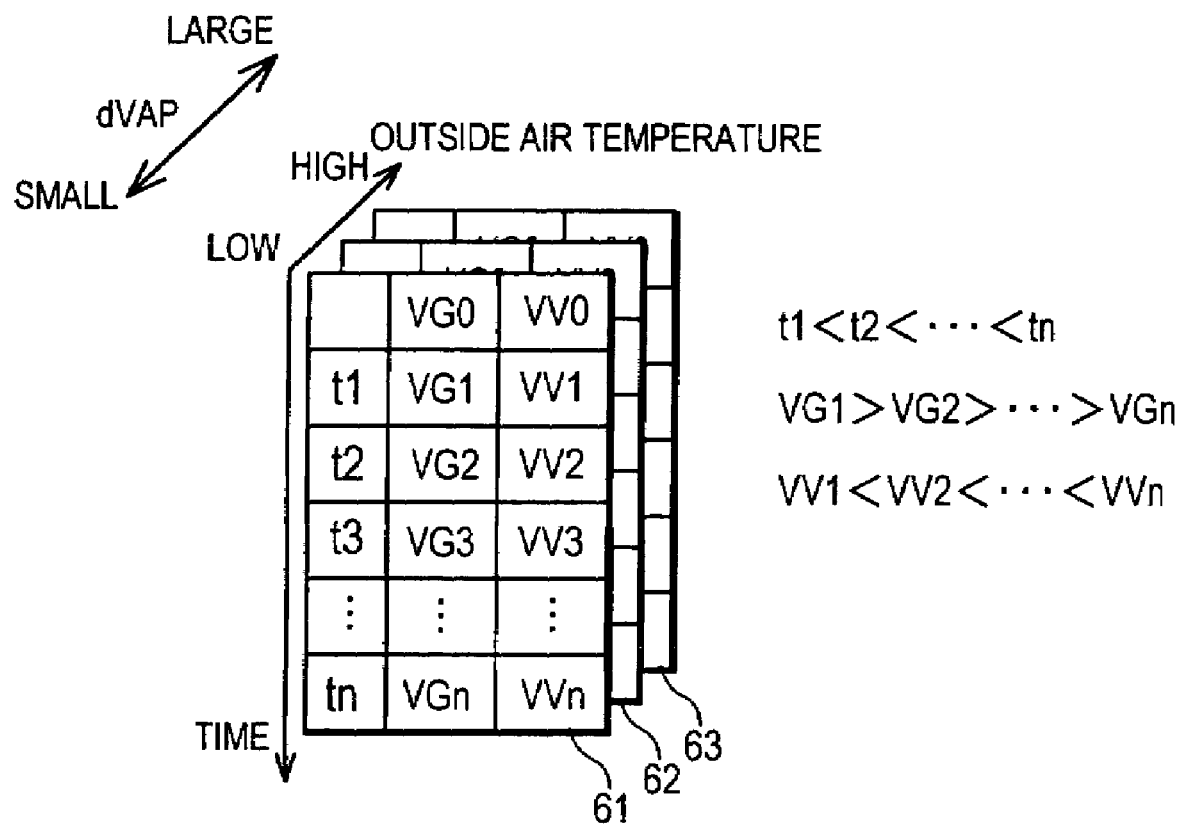
FIG. 8 is a table showing a third embodiment of this invention, and specifying a relation between an elapsed time from the start of thawing, outside air temperature and valve openings.
Figure 9:
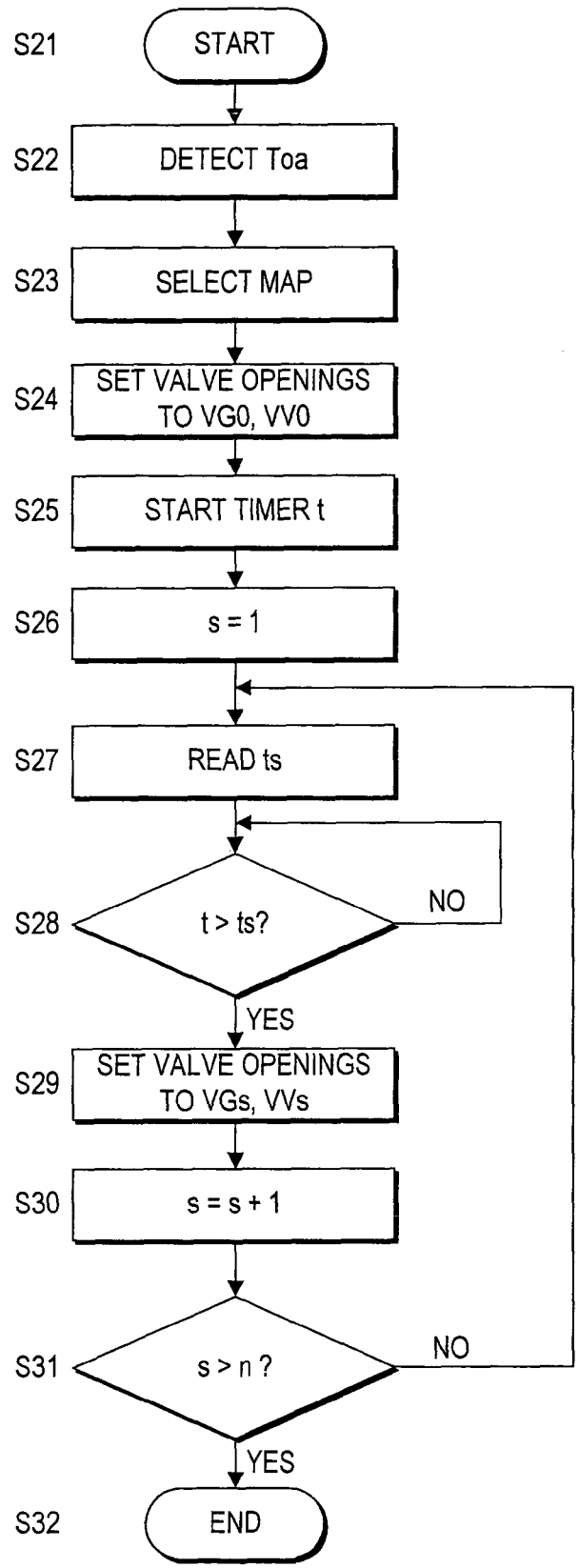
FIG. 9 is a flowchart showing the fuel cell thawing start processing.

FIG. 8, FIG. 9 are valve opening setting tables stored in the memory of the controller 20, and a flowchart showing the thawing startup processing of the fuel cell 1 performed by the controller 20. Apart from the control performed by the controller 20, this embodiment is identical to the first embodiment.

Whereas in the first embodiment, the valve opening setting table was defined relative to the temperature T of the fuel cell 1, in this embodiment it is defined relative to the time (elapsed time t) from the beginning of startup processing as shown in FIG. 8. Plural valve opening setting tables 61–63 are also provided depending on the outside air temperature when startup processing begins. The mixing ratio of dry, hot gas and steam, i.e., the steam amount in the gas flow supplied to the fuel cell 1, is controlled according to the flowchart shown in FIG. 9.

First, in a step S21, thawing startup processing of the fuel cell 1 begins, and in a step S22, the outside air temperature Toa surrounding the vehicle is detected. In a step S23, the most suitable table is selected from among the plural tables 61 to 63 according to the outside air temperature when startup processing begins.

In a step S24, the valves 11 to 13 are opened, and the openings of the valves 8, 9 are set to the initial values VG0, VV0 respectively stored in the tables. In a step S25, a timer t in the controller 20 is reset to zero, and this parameter t subsequently increases with the elapsed time. Also, in a step S26, the time step s is set to one.

In a step S27, a time ts corresponding to the time step s is read from a table, and first, a time t1 corresponding to the step s=1 is read. In a step S28, the elapsed time t is compared with the time t1, and when the elapsed time reaches the time t1, the routine proceeds to a next step S29. In the step S29, valve openings VG1, VV1 corresponding to the time step at that time (in this case, s=1) are read from the table, and the openings of the valves 8, 9 are set respectively to VG1, VV1.

Subsequently, the time step s is incremented in a step S30 in the same way as in the preceding embodiment. In a step S31, termination is determined, and if there are still time steps remaining, the routine returns to the step S27 and the processing of the steps S27–S31 is repeated.

In this way, in this embodiment, the openings of the valves 8, 9 are controlled by looking up a table according to the elapsed time t from the start of thawing startup processing. The time ts and valve openings VGs, VVs in the table are defined beforehand according to the following ideas.

The temperature of the fuel cell 1 increases according to the time from when hot gas flow begins to flow in the fuel cell 1, so the temperature of the fuel cell 1 can be determined from the time. Based on this factor, the period from when thawing startup processing begins to when the fuel cell 1 is completely thawed is divided into time steps, and the temperature of the fuel cell 1 at each time is estimated. The maximum amount of steam which can be passed through the fuel cell 1 without causing blockage of the passages due to condensation of water is computed from the estimated temperature of the fuel cell 1, and the valve openings VVs, VGs for realizing this steam proportion are respectively computed and set to the values in the table.

Further, the temperature variation when gas is passed into the frozen fuel cell 1 differs according to the initial temperature of the fuel cell 1. The initial temperature prior to passing gas into the fuel cell 1 depends on the outside air temperature, and in general it is effectively equal to the outside air temperature. Therefore, if plural tables are provided according to the outside air temperature when startup processing begins, it is possible to deal with the case when the initial temperature of the fuel cell 1 is different. As the temperature rise of the fuel cell 1 becomes less sharp, the lower the outside air temperature becomes when startup processing begins, the values in the tables are set so that the increase rate dVAP of the steam amount of the gas flow decreases, the lower the outside air temperature becomes when startup processing begins.

To simplify the system, the provision of separate tables according to the outside air temperature may be omitted. In this case, a table set according to the lowest outside air temperature which can be envisaged in practice may be used for all temperature conditions.

An identical effect to that of the first embodiment is obtained if the control is performed based on time instead of detecting the temperature of the fuel cell 1, and this also avoids the need for a sensor to detect the temperature of the fuel cell 1.

The entire contents of Japanese Patent Application P2001-342941 (filed Nov. 8, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention may be applied to various fuel cell systems using water including those in vehicles, and it is effective to prevent blockage of passages when the fuel cell system is started from a low temperature state.

The invention claimed is:

1. A method for starting a fuel cell from a low temperature state, comprising:
   passing dry, hot air as a gas flow into a fuel gas passage, oxidizing agent passage and cooling liquid passage in the fuel cell when startup processing begins, and
   introducing steam in the gas flow and varying an amount of steam introduced in the gas flow in stages according to a temperature of the fuel cell after the startup processing begins.

2. The method of starting the fuel cell as defined in claim 1, further comprising:
   increasing the steam amount contained in the gas flow according to a temperature rise of the fuel cell after startup processing begins.

3. The method of starting the fuel cell as defined in claim 2, further comprising:
   increasing the steam amount contained in the gas flow more slowly as an outside air temperature at the beginning of the startup processing becomes lower.

4. The method of starting the fuel cell as defined in claim 1, further comprising:
   passing the gas flow consisting of dry hot air into the passages in the fuel cell while the temperature of the fuel cell is lower than a predetermined temperature, and introducing steam into the gas flow when the temperature of the fuel cell becomes higher than the predetermined temperature.

5. The method of starting the fuel cell as defined in claim 4, wherein:

the predetermined temperature is higher than a lower limit at which, when steam is passed into the passages in the fuel cell, the steam in the passages in the fuel cell does not cause blockage of the passages due to condensation.

6. The method of starting the fuel cell as defined in claim 4, wherein:

the predetermined temperature is higher than an upper limit at which, when steam is passed into the passages in the fuel cell, the steam in the passages in the fuel cell causes blockage of the passages.

7. The method of starting the fuel cell as defined in claim 1, further comprising:

varying a mixing ratio of dry, hot air and steam in the gas flow based on a temperature rise of the fuel cell.

8. The method of starting the fuel cell as defined in claim 7, further comprising:

storing the relation between the mixing ratio of dry, hot air and steam at which the steam causes blockage of the passages due to condensation of the fuel cell, and the temperature of the fuel cell by a memory, and determining the mixing ratio of dry, hot air and steam referring to the stored relation according to the temperature of the fuel cell.

9. The method of starting the fuel cell as defined in claim 1, further comprising:

detecting an outlet temperature of one of the passages in the fuel cell, and estimating a temperature of the fuel cell from the detected outlet temperature.

10. The method of starting the fuel cell as defined in claim 1, further comprising:

controlling a mixing ratio of dry, hot air and steam in the gas flow to increase the steam amount of the gas flow according to an elapsed time from the beginning of startup processing.

11. The method of starting the fuel cell as defined in claim 10, further comprising:

controlling the mixing ratio of dry, hot air and steam in the gas flow to increase the steam amount contained in the gas flow more slowly as an outside air temperature at the beginning of the startup processing becomes lower.

* * * * *